(12) United States Patent
Oslund

(10) Patent No.: US 9,895,803 B1
(45) Date of Patent: Feb. 20, 2018

(54) CALCULATING TRAJECTORY CORRIDOR FOR ROBOT END EFFECTOR

(71) Applicant: X Development LLC, Mountain View, CA (US)

(72) Inventor: Kenneth Oslund, Mountain View, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 161 days.

(21) Appl. No.: 14/744,689

(22) Filed: Jun. 19, 2015

(51) Int. Cl.
*B25J 9/16* (2006.01)

(52) U.S. Cl.
CPC ... *B25J 9/1666* (2013.01); *G05B 2219/36504* (2013.01); *G05B 2219/40476* (2013.01)

(58) Field of Classification Search
CPC ......... B25J 9/1666; G05B 2219/36504; G05B 2219/40476
See application file for complete search history.

(56) References Cited

U.S. PATENT DOCUMENTS

| | | | | |
|---|---|---|---|---|
| 5,776,136 | A * | 7/1998 | Sahay | A61B 17/58 606/79 |
| 5,789,890 | A * | 8/1998 | Genov | B25J 9/1615 318/567 |
| 6,408,224 | B1 | 6/2002 | Okamoto et al. | |
| 6,643,563 | B2 | 11/2003 | Hosek et al. | |
| 8,204,623 | B1 | 6/2012 | Bhattacharyya et al. | |
| 8,855,815 | B2 * | 10/2014 | Mizutani | G05B 19/423 318/560 |
| 9,198,603 | B2 * | 12/2015 | Sakuragi | A61B 5/02007 |
| 9,327,401 | B2 * | 5/2016 | Xiao | B25J 9/163 |
| 2004/0024311 | A1 * | 2/2004 | Quaid, III | A61B 90/36 600/428 |
| 2006/0082340 | A1 | 4/2006 | Watanabe et al. | |
| 2008/0004632 | A1 | 1/2008 | Sutherland et al. | |
| 2011/0035051 | A1 * | 2/2011 | Kim | B25J 9/1666 700/246 |
| 2011/0128555 | A1 * | 6/2011 | Rotschild | G02B 27/2271 356/625 |

(Continued)

FOREIGN PATENT DOCUMENTS

| WO | 2012143044 | 10/2012 |
|---|---|---|
| WO | 2014145471 | 9/2014 |

OTHER PUBLICATIONS

Aljarboua, Ziyad. "Geometric Path Planning for General Robot Manipulators." World Congress on Engineering and Computer Science. vol. 2; 2009; 5 pages.

(Continued)

*Primary Examiner* — Nicholas Kiswanto
(74) *Attorney, Agent, or Firm* — Middleton Reutlinger

(57) ABSTRACT

Methods, apparatus, systems, and computer-readable media are provided for calculating a trajectory corridor for a robot end effector. In some implementations, a seed path may be determined between first and second sites that is traversable by a reference point associated with an end effector of a robot. Then, a trajectory corridor may be calculated that encompasses and expands the seed path. In some implementations, a plurality of candidate paths may be determined through the trajectory corridor that are traversable by the reference point. In some implementations, a candidate path that satisfies a criterion may be selected.

16 Claims, 7 Drawing Sheets

(56) References Cited

U.S. PATENT DOCUMENTS

| | | |
|---|---|---|
| 2012/0210817 A1 | 8/2012 | Kassow et al. |
| 2012/0215354 A1 | 8/2012 | Krasny et al. |
| 2012/0239199 A1 | 9/2012 | Danko |
| 2013/0151000 A1* | 6/2013 | Mackman ............... G06F 17/00 700/186 |
| 2013/0178980 A1* | 7/2013 | Chemouny ............ B25J 9/1671 700/255 |
| 2013/0345853 A1* | 12/2013 | Berman ............. G05B 19/4093 700/187 |
| 2014/0012419 A1 | 1/2014 | Nakajima |
| 2014/0249675 A1 | 9/2014 | Krishnasamy et al. |
| 2014/0277737 A1 | 9/2014 | Sekiyama et al. |

OTHER PUBLICATIONS

Boryga, Marek. "Trajectory Planning of End-Effector for Path with Loop" Strojnitki vestnik-Journal of Mechanical Engineering; 60(12), 2014; pp. 804-814.

* cited by examiner

US 9,895,803 B1

CALCULATING TRAJECTORY CORRIDOR FOR ROBOT END EFFECTOR

BACKGROUND

Robot trajectory planning is traditionally performed using one of two techniques: shortest time and shortest path. Shortest time is the fastest trajectory that will move a robot (or a portion thereof) between two positions. However, existing robots typically optimize for time by taking the most direct path between poses in joint space. Because the transform between joint space and Cartesian space for the average industrial robot is very complex, the path the robot takes when attempting to achieve the shortest time will not likely be straight in Cartesian space. A robot technician has little control over the intermediate path when the robot is operating in shortest time mode. Thus, if the robot strikes an obstacle along the way, the technician may need to switch to using a shortest path technique to define intermediate waypoints to avoid the obstacle. The shortest path technique generates a trajectory that is a straight line in Cartesian space between two positions. However, because of the complex transform between joint and Cartesian space, this trajectory could be very sub-optimal. For example, a joint might have to turn in one direction, stop, reverse direction, and go back to near its original starting position. Additionally, if the robot must exactly follow a straight line between a series of waypoints, it must also come to a near stop every time it changes direction, which may increase the wear on the robot and reduce the speed at which the robot can execute motions. While techniques exist to increase trajectory smoothness, these techniques generally only operate at or very near waypoints.

SUMMARY

The present disclosure is generally directed to methods, apparatus, and computer-readable media (transitory and non-transitory) for calculating trajectory corridors for robot end effectors, and/or for selecting paths through the trajectory corridors based on various criteria. In various implementations, a seed path between sites may be defined. Then, a trajectory corridor may be calculated, e.g., by expanding the seed path (e.g., by dilation), generating a plurality of volumes along the seed path, and/or otherwise defining a corridor that encompasses the seed path. The trajectory corridor may be rendered in multiple dimensions on a graphical user interface, e.g., so that a user may see that certain portions of the trajectory corridor are likely to intersect obstacles and/or would violate kinematic constraints (e.g., be unreachable by the robot). In some instances, one or more portions of the trajectory corridor may be adjusted, e.g., by the user or automatically, so that the trajectory corridor no longer will intersect obstacles or include regions that violate the robot's kinematic constraints. Then, multiple paths and/or sequences of joint configurations (or "poses") that may be struck by a robot while traversing an end effector through the trajectory corridor may be determined and selected based on one or more criteria (e.g., a measure of trajectory smoothness, minimize operational component movement, optimal path, etc.).

Calculating trajectory corridors for robot end effectors, and/or selecting paths through the trajectory corridors based on various criteria, provides various technical advantages. For example, defining a specific path for a robot end effector to follow may be simple for a user, but may offer little flexibility and may be a non-ideal path. By calculating a trajectory corridor that expands and encompasses the user-defined path, it is possible to calculate multiple paths through the corridor and determine which satisfy some criteria, such as the path through the trajectory corridor that causes the robot to experience the least wear and tear, or the path through the trajectory corridor that exhibits an acceptable measure of trajectory smoothness.

In some implementations, a computer implemented method may be provided that includes the steps of: determining a seed path between first and second sites that is traversable by a reference point associated with an end effector of a robot; calculating, based on the seed path, a trajectory corridor that encompasses and expands the seed path; determining a plurality of candidate paths through the trajectory corridor that are traversable by the reference point; and selecting, from the plurality of paths, a candidate path that satisfies a criterion.

This method and other implementations of technology disclosed herein may each optionally include one or more of the following features.

In various implementations, the trajectory corridor may have a width that varies along the seed path. In various implementations, calculating the trajectory corridor may include calculating a plurality of volumes that, arranged along the seed path, form the trajectory corridor. In various implementations, the method may include altering a width of a portion of the trajectory corridor based on a proximity of the portion to an obstacle. In various implementations, calculating the trajectory corridor may include dilating the seed path to a selected width.

In various implementations, the method may further include rendering, in a graphical user interface, a multi-dimensional depiction of one or both of the seed path and the trajectory corridor. In various implementations, the method may include identifying a portion of the trajectory corridor that intersects an obstacle, or that likely could interest an obstacle. In various implementations, the method may include visually emphasizing the identified portion of the trajectory corridor.

In various implementations, the method may further include: calculating, based on the trajectory corridor and the seed path, a first candidate path through the trajectory corridor; rendering, in the graphical user interface, a multi-dimensional depiction of the first candidate path; determining that the first candidate path fails to satisfy the criterion; calculating, based on the trajectory corridor and the first candidate path, a second candidate path through the trajectory corridor; and rendering, in the graphical user interface, a multi-dimensional depiction of the second candidate path.

In various implementations, determining the seed path includes receiving, via a graphical user interface, an indication of the seed path. In various implementations, determining the seed path includes receiving an indication of the seed path recorded by the robot while the robot is manually manipulated along the seed path. In various implementations, the criterion is a measure of trajectory smoothness. In various implementations, the method may further include identifying a portion of the trajectory corridor that violates a kinematic constraint of the robot. In various implementations, the method may further include rendering, in the graphical user interface, the identified portion of the trajectory corridor in a different color or fill pattern than a remainder of the trajectory corridor.

In some implementations, a method may include the following operations: rendering, on a display, a graphical user interface that includes a depiction of an environment in which a robot is to operate; receiving drawing input indicative of a path traced by a user within the depiction of the environment; determining, in response to the drawing input, a trajectory corridor between first and second sites, at least a portion of the trajectory corridor having a width such that a reference point associated with an end effector of the robot is traversable along multiple paths through the trajectory corridor; determining a plurality of candidate paths through the trajectory corridor that are traversable by the reference point of the end effector; and selecting, from the plurality of candidate paths, a candidate path that satisfies a criterion.

Other implementations may include a non-transitory computer readable storage medium storing instructions executable by a processor to perform a method such as one or more of the methods described above. Yet another implementation may include a control system including memory and one or more processors operable to execute instructions, stored in the memory, to implement one or more modules or engines that, alone or collectively, perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
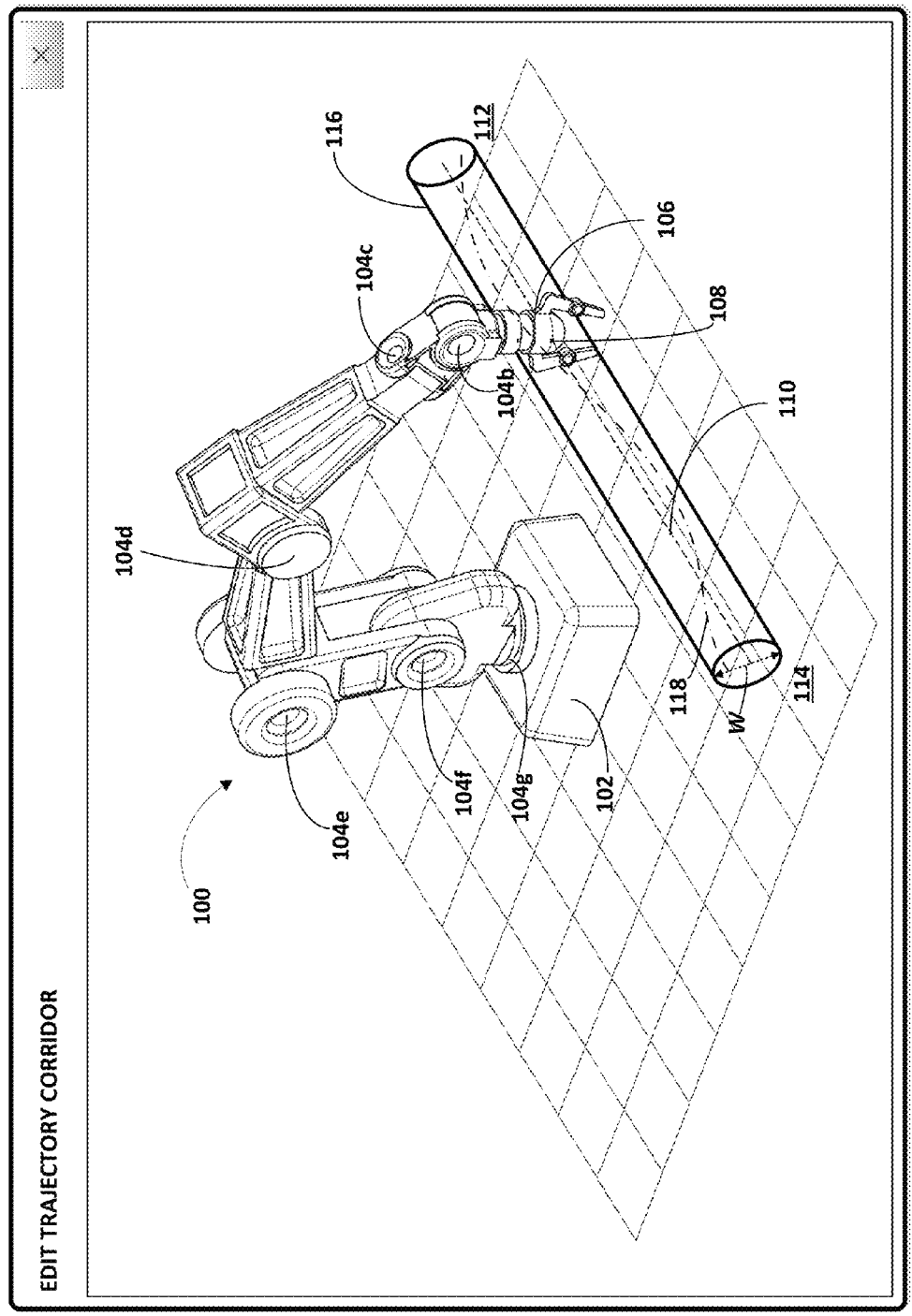
FIGS. 1 illustrates an example dialog for editing a robot trajectory corridor, in accordance with various implementations.

FIG. 1 illustrates an example graphical user interface dialog entitled "EDIT TRAJECTORY CORRIDOR," in which a robot 100 (in a form often referred to as a "robot arm") is depicted in multiple dimensions. In this example, robot 100 includes a base 102 and a plurality of operational components, seven of which are referenced in FIG. 1 with 104a-g. Robot 100 may include other operational components, but those are not labeled in FIG. 1 for the sakes of clarity and brevity. As used herein, an "operational component" of a robot may refer to actuators, motors (e.g., servo motors), joints, shafts, gear trains, pumps (e.g., air or liquid), pistons, drives, or other components that may create and/or undergo propulsion, rotation, force, torque, velocity, and/or motion. Some operational components may be independently controllable, although this is not required. In some instances, the more operational components robot 100 has, the more degrees of freedom of movement it may have.

Robot 100 also includes an end effector 106. As used herein, "end effector" may refer to a variety of tools that may be operated by robot 100 in order to accomplish various tasks. In FIG. 1, for example, end effector 106 takes the form of a claw with two opposing "fingers" or "digits." The claw is one type of "gripper" known as an "impactive" gripper. Other types of grippers may include but are not limited to "ingressive" (e.g., physically penetrating an object using pins, needles, etc.), "astrictive" (e.g., using suction or vacuum to pick up an object), or "contigutive" (e.g., using surface tension, freezing or adhesive to pick up object). More generally, other types of end effectors may include but are not limited to drills, brushes, force-torque sensors, cutting tools, deburring tools, welding torches, and so forth. In some implementations, end effector 106 may be removable, and various types of modular end effectors may be installed onto robot 100, depending on the circumstances.

End effector 106 may define an abstract reference point 108. Reference point 108 may be a point of end effector 106 that traverses a particular path when robot 100 moves end effector 106 between sites. In some implementations, reference point 108 may be a center of gravity of end effector 106, or a point near where end effector 106 attaches to robot 100, although this is not required. Robots typically, and robot 100 in particular, may have multiple degrees of freedom of movement. Accordingly, and as noted in the background, it is possible for robot 100 to traverse reference point 108 of end effector 106 along the same path in multiple ways, each time assuming a different set of joint configurations, or "poses." As used herein, a "joint configuration" or "pose" refers to a particular configuration of joints of robot 100 relative to one another at a particular moment in time (e.g., a "snapshot"). When robot 100 is inactive, it may be in (or "strike") a single joint configuration until it moves again. When robot 100 moves, it may assume a series of joint configurations to effectuate the movement.

As noted in the background, while shortest path planning techniques may be used when shortest time techniques cause a robot collision, shortest path techniques may not necessarily yield the smoothest path. Additionally, the shortest path may not necessarily be the best option when taking into account other factors, such as various costs that may be incurred when robot 100 traverses end effector 106 between sites. Accordingly, in various implementations, a path (e.g., shortest path) between first and second sites that is traversable by reference point 108 of end effector 106 may be used as a "seed path" to calculate a so-called "trajectory corridor" that encompasses and expands the seed path. Then, a plurality of candidate paths through the trajectory corridor may be calculated. Each candidate path may be traversable by a reference point of a robot end effector through the corridor. Then, one or more candidate paths that satisfy a criterion may be selected for implementation.

Referring back to FIG. 1, a multi-dimensional depiction of a relatively straight seed path 110 defined between a first location 112 and a second location 114 is shown. Seed path 110 may be defined in various ways. In some implementations, a user may manually manipulate robot 100 to move end effector 106 along a particular path between a sequence of two or more sites while robot 100 continuously records its path (e.g., by continuously recording coordinates of its various components and parts). As another example, an environmental detection device (not depicted) such as a camera (e.g., a three-dimensional camera), laser range finder, a radar sensor, or any other sensor that can provide a measure of the environment, may detect a seed path between the sequence of sites, e.g., taking into account various constraints such as obstacles in or near the path. As yet another example, a user may operate a graphical user interface such as that depicted in FIG. 1 to provide an indication of a seed path between the sequence of sites, e.g., by defining a series of waypoints.

However the seed path is defined, a trajectory corridor 116 may be calculated based on seed path 110 that encompasses and expands seed path 110. In in the dialog of FIG. 1, for instance, a trajectory corridor 116 is depicted in multiple dimensions in the form of a cylindrical tunnel that is approximately coaxial with seed path 110, and that has a uniform width W (or diameter) along the length of seed path 110. However, it is not required that seed path 110 necessarily be coaxial with trajectory corridor 116, or that seed path 110 be at the same relative position within trajectory corridor 116 along an entire length of seed path 110. It is also not required that the entire length of trajectory corridor 116 be have a uniform width, and examples of non-uniformed widths will be described below.

In some implementations, trajectory corridor 116 may be calculated by dilating seed path 110 to a desired width. In some implementations, dilation of trajectory corridor 116 may be performed iteratively. For example, a user may define seed path 110, and then may operate a graphical user interface such as the dialog depicted in FIG. 1 to calculate trajectory corridor 116 having a first width, W. Assuming the entirety of trajectory corridor 116 is still within the reach of robot 100, and assuming trajectory corridor 116 does not yet intersect static (e.g.,. non-moving) obstacles or space that is likely to be occupied by dynamic (e.g., moving) obstacles, the user may operate the graphical user interface to dilate trajectory corridor 116 again, e.g., to have a width of W+ΔW. The user may repeat this process until a portion of trajectory corridor 116 beings to exceed the reach of robot 100 and/or until trajectory corridor 116 begins to impede on environmental obstacles. If the user dilates (or expands) trajectory corridor 116 too much, the user may also have the ability to iteratively retract trajectory corridor 116 (or portions thereof) to a desired width.

In various implementations, a plurality of candidate paths through trajectory corridor 116 may be calculated. Then, a candidate path that satisfies one or more criteria (examples described below) may be selected for implementation. In some implementations, calculating the plurality of candidate paths may involve calculating, in the abstract, alternative paths (e.g., sequences of waypoints, smooth curves) through trajectory corridor 116. One example candidate path 118 through trajectory corridor 116 is depicted in a dash-dot-dashed line in FIG. 1. Additionally, for each candidate path, it may be possible for robot 100 to strike a particular sequence of joint configurations (or "poses") as it traverses reference point 108 along the particular candidate path. In some implementations, each of these candidate sequences of joint configurations may also be calculated and considered.

Figure 2B:
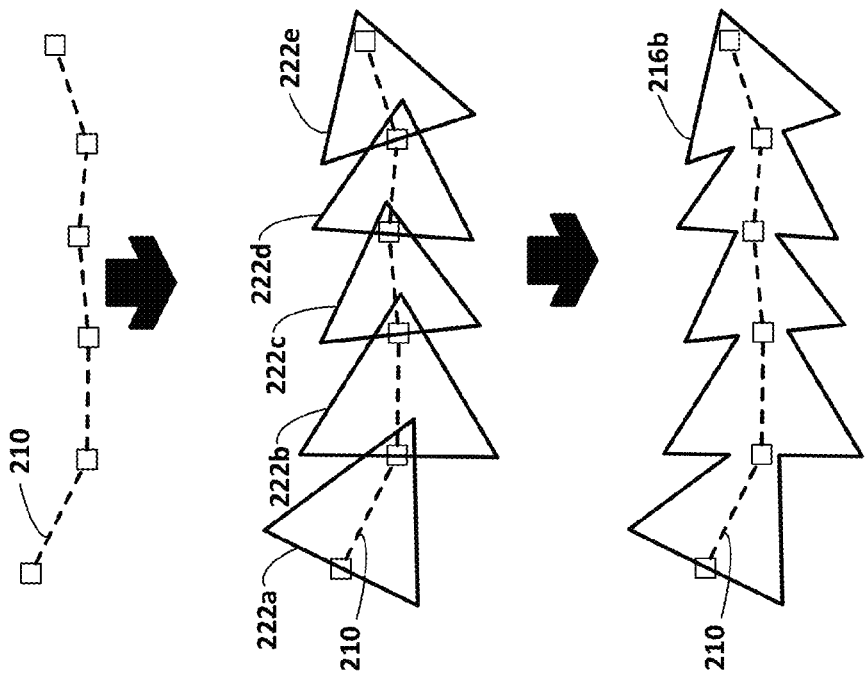
FIGS. 2A and B illustrate examples of volumes that may be calculated as part of a trajectory corridor, in accordance with various implementations.
Figure 2A:
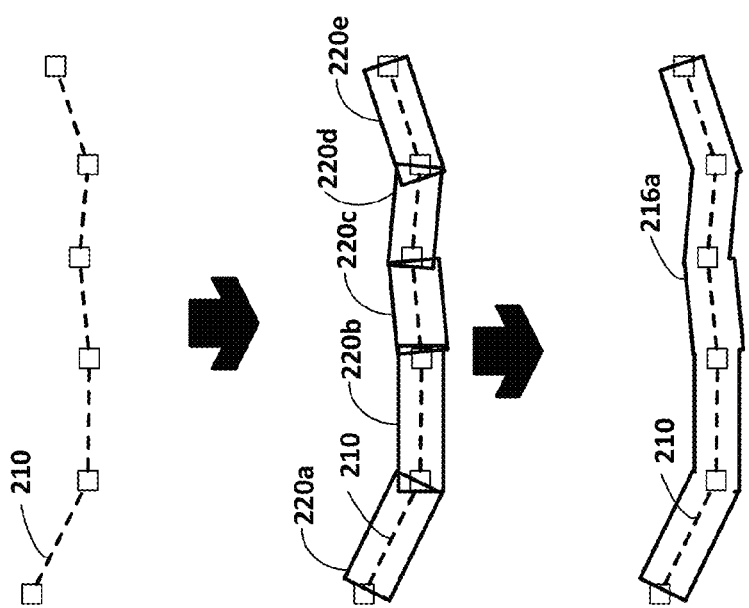

As noted above, a trajectory corridor need not have a uniform width along the seed path, as was the case with FIG. 1. For example, in FIG. 2A, a seed path 210 is defined that includes several waypoints connected by a series of straight path segments. Then a plurality of cylindrical volumes 220a-e is calculated that encompass each straight path segment of seed path 210. When plurality of cylindrical volumes 220a-e are arranged along a length of seed path 210, they may collectively (e.g., via a union of the volumes) form trajectory corridor 216a. In FIG. 2B, the same seed path 210 is defined. A plurality of cone-shaped volumes 222a-e may be calculated that encompass seed path 210. When the plurality of cone-shaped volumes 222a-e are arranged along a length of seed path 210, they may collectively (e.g., via a union of the volumes) form another trajectory corridor 216b. While seed path 210 is depicted in FIGS. 2A and 2B as being a series of straight segments connecting a series of waypoints, this is not meant to be limiting. In other implementations, the seed path may be a relatively smooth curve, and volumes encompassing the smooth curve may be calculated in manners similar to that depicted in FIGS. 2A and 2B.

Figure 3:
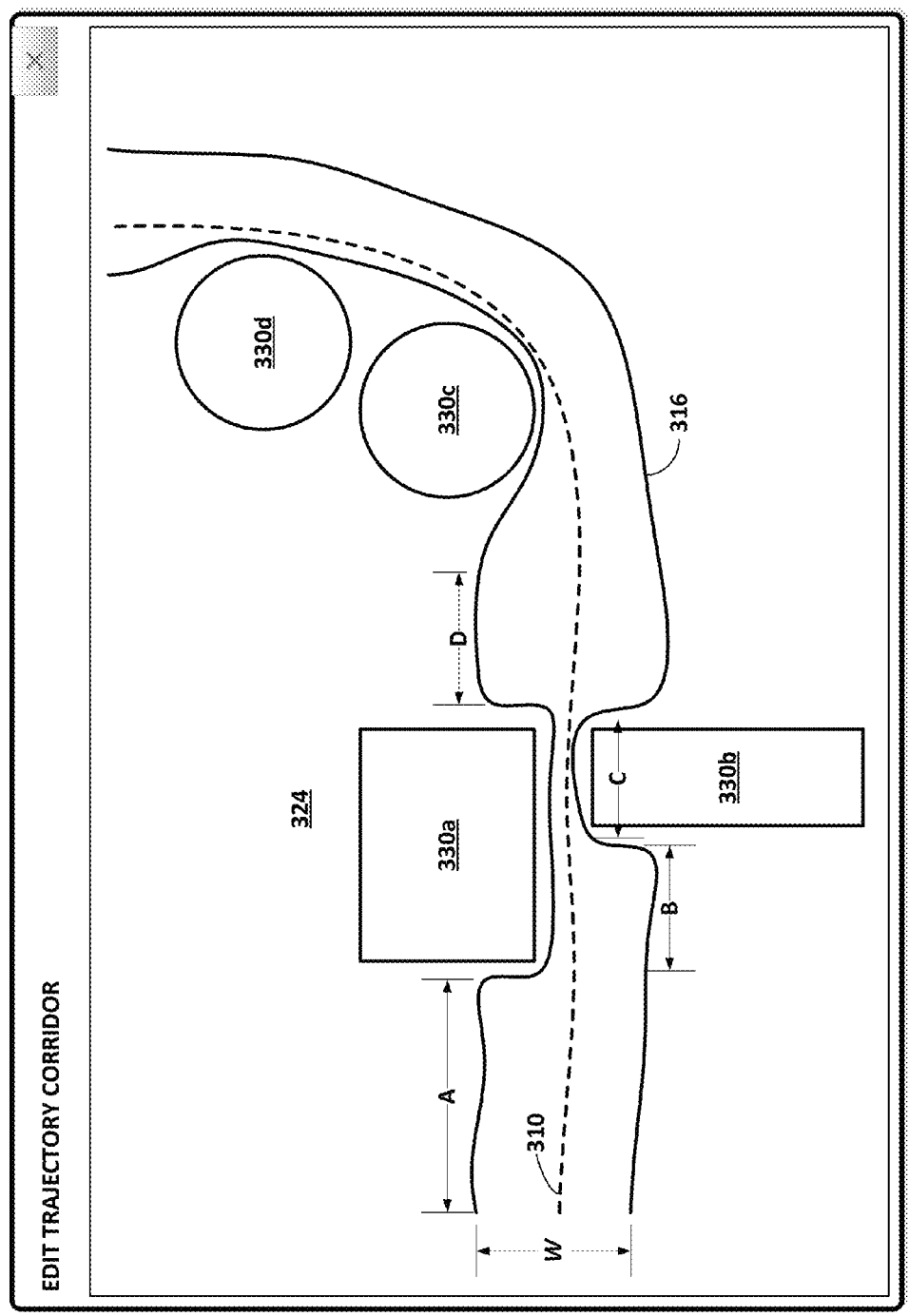
FIG. 3 illustrates another example dialog for editing a trajectory corridor, in accordance with various implementations.

Another example of a non-uniform width trajectory corridor is depicted in FIG. 3. In FIG. 3, an "EDIT TRAJECTORY CORRIDOR" dialog that may be presented as part of a graphical user interface includes a depiction of an environment 324 in which a robot (e.g., 100) is to operate. While the depiction of environment 324 is two-dimensional, the techniques described herein are equally applicable to three-dimensional depictions of environments, such as that of FIG. 1. Environment 324 includes a plurality of obstacles, 330a-d, which may be furniture, equipment, architectural features, and so forth. Some obstacles may be "static," in that their position relative to environment 324 may not change. Other obstacles may be "dynamic," in that their position relative to environment 324 may change over time.

A seed path 310 is depicted that passes between the various obstacles 330 through environment 324. A trajectory corridor 316 is also depicted that encompasses seed path 310. Following seed path 310 from left to right, trajectory corridor 316 begins with a width of W, which it maintains through the region denoted "A." However, once seed path 310 reaches the region denoted "B," a first obstacle 330a blocks part of trajectory corridor 316. Accordingly, for the length of the region denoted "B," trajectory corridor 316 is narrowed to avoid obstacle 330a. In this region, trajectory corridor 316 also is not coaxial with seed path 310. In the region of FIG. 3 denoted as "C," trajectory corridor is further narrowed to account for another obstacle, 330b. In the region denoted "D," trajectory corridor 316 is expanded back to its original width, W, because no obstacles are present. However, to the right of the region denoted "D," trajectory corridor 316 once again is narrowed to avoid obstacles 330c and 330d.

A user may narrow or widen a portion of trajectory corridor 316, or may cause it to be positioned out of alignment with (i.e. no coaxial) with seed path 310, in a variety of ways. In some implementations, the user may select a portion or length of trajectory corridor 316, e.g., using a mouse, and may input a desired width for that portion or length. In some implementations, a user may select an edge of trajectory corridor 316, e.g., using a mouse, and may drag the edge of trajectory corridor 316 towards or away from a center of trajectory corridor 316 and/or seed path 310, narrowing or expanding trajectory corridor 316 in the process. In implementations in which a touch screen display is deployed, a user may "squeeze" a portion of trajectory corridor by dragging two fingers closer together on the touch screen.

Figure 4:
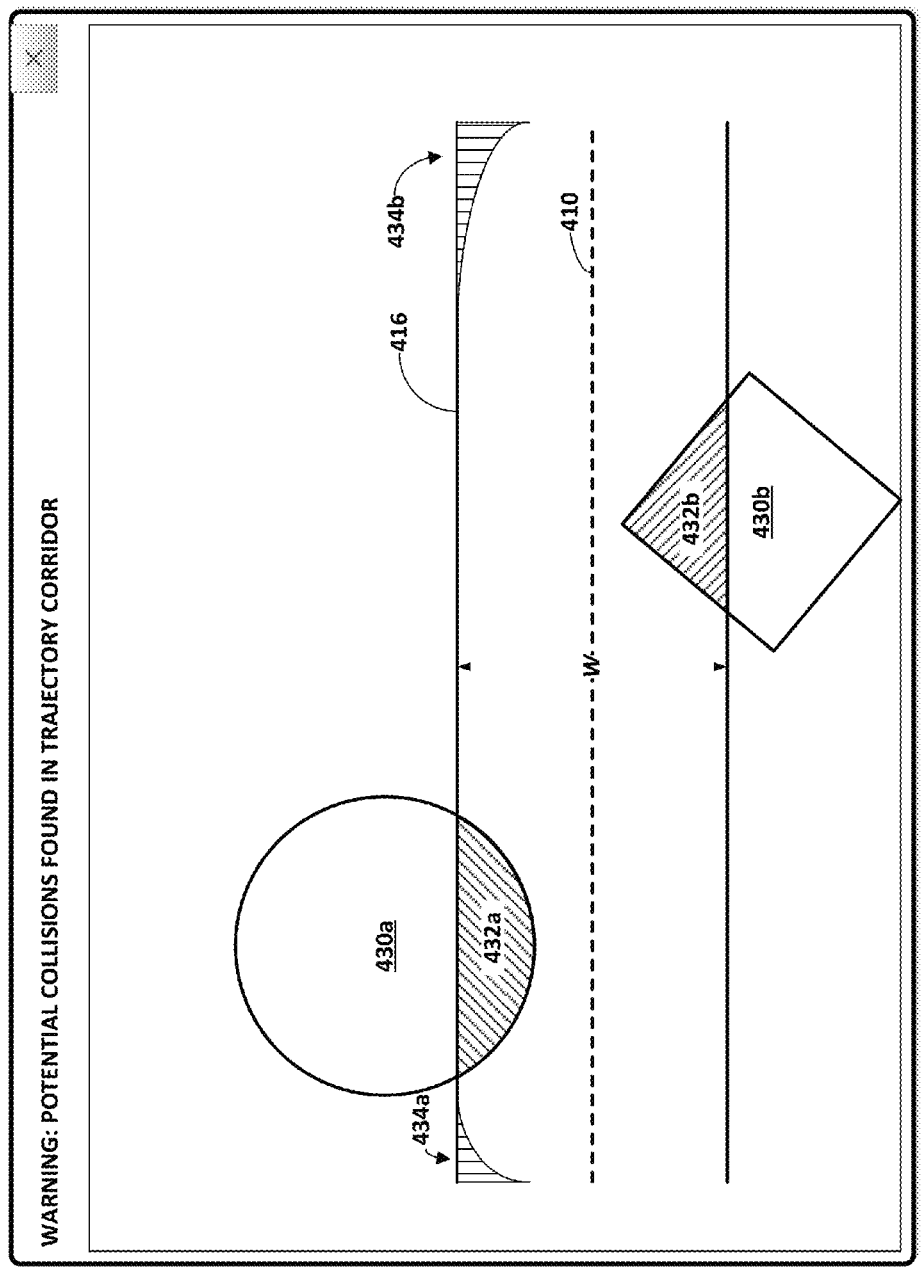
FIG. 4 illustrates another example dialog for editing a trajectory corridor, in accordance with various implementations.

Referring now to FIG. 4, a dialog for editing a trajectory corridor 416 entitled "WARNING: POTENTIAL COLLISIONS FOUND IN TRAJECTORY CORRIDOR" is depicted. In this example, a seed path 410 passes between static obstacles 430a and 430b. As a consequence of being dilated to a width W, trajectory corridor 416 intersects obstacles 430a and 430b at two portions, 432a and 432b, respectively. In various implementations, these portions 432a-b may be visually emphasized, e.g., rendered with a particular color, fill pattern, or other visual characteristics. Also visible in FIG. 4 are two trajectory corridor 416 portions, 434a and 434b, that violate kinematic constraints (e.g., are not reachable by) of a robot (not depicted). Like portions 432a-b of trajectory corridor 416 that intersect obstacles 430a-b, portions 434a-b may also be visually emphasized, e.g., by being rendered with a particular color or fill pattern. With the portions 432a-b and 434a-b visually emphasized to be conspicuous to a user, the user may take responsive action, such as narrowing trajectory corridor 416 at these portions or along the entire length of seed path 410.

Figure 5:
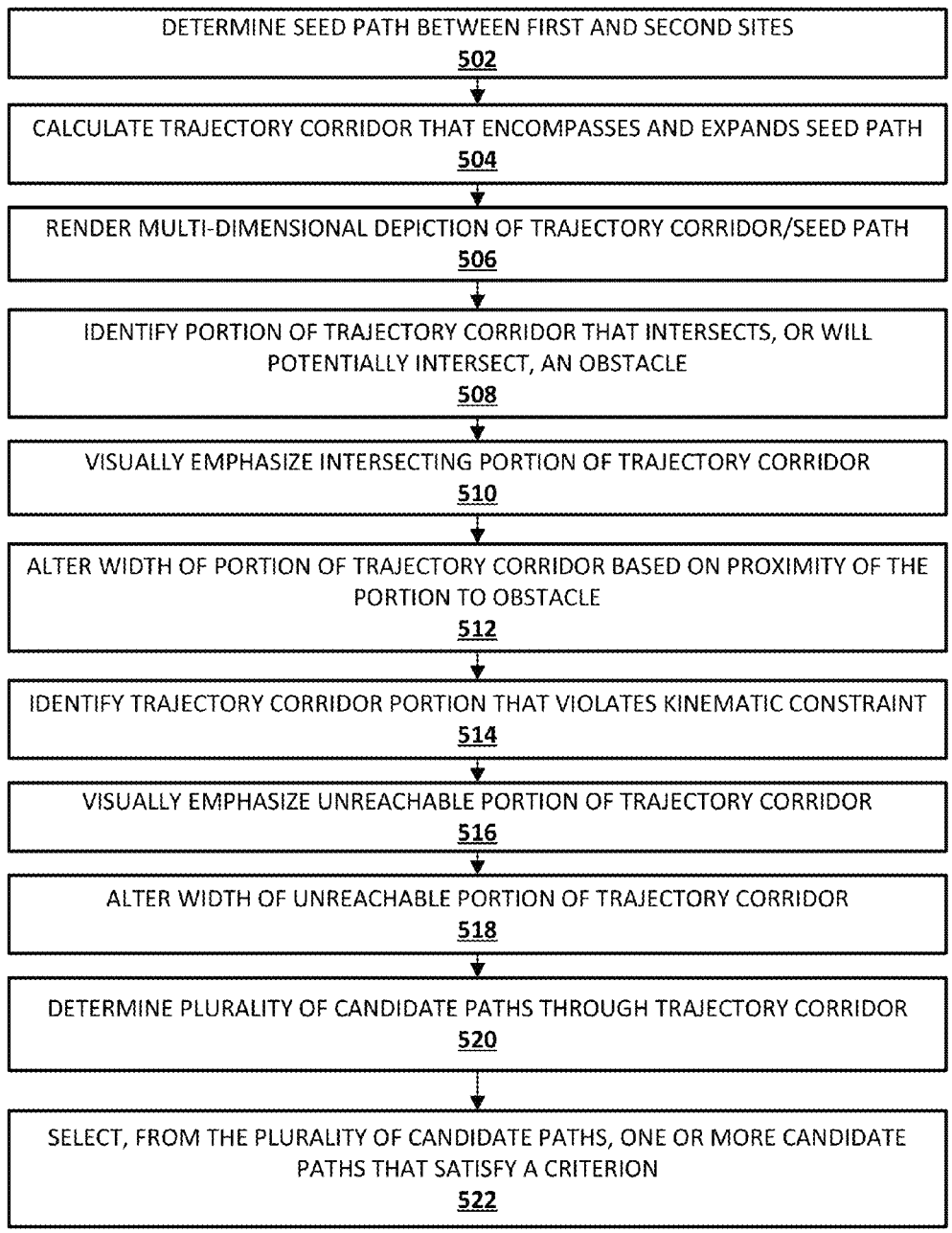
FIG. 5 depicts a flow chart illustrating an example method of calculating a trajectory corridor for a robot end effector, in accordance with various implementations.

Referring now to FIG. 5, an example method 500 of selecting a candidate physical arrangement of an object to be acted upon by a robot is described. For convenience, the operations of flow charts are described with reference to a system that performs the operations. This system may include various components of various computer systems, including computing elements of robot 100 and/or computing systems remote from robot 100, such as control system 650 in FIG. 6. Moreover, while operations of method 500 are shown in a particular order, this is not meant to be limiting. One or more operations may be reordered, omitted or added.

At block 502, the system may determine a seed path between first and second sites that is traversable by an end effector of a robot. As noted above, a seed path may be defined in a variety of ways, e.g., by a user and/or automatically. For example, a technician may operate a graphical user interface to transition a robot into a "record path" mode in which the technician manually moves the robot's end effector along a desired seed path while the robot continuously and/or periodically records its coordinates. Or, the technician may operate a graphical user interface to define, e.g., in a rendered multi-dimensional environment, a series of waypoints that collectively define the seed path.

However the seed path is defined, at block 504, the system may calculate a trajectory corridor that encompasses and expands the seed path. In some implementations, the trajectory corridor calculated at block 504 may have a user-selected cross-sectional shape, such as an ellipse, circle, rectangle, or any polygon. In some implementations, the trajectory corridor may have a uniform width along the length of seed path, though this is not required. In some implementations, the trajectory corridor may include a plurality of volumes "strung" together along a seed path, as depicted in FIGS. 2A and 2B. At block 506, the system may render, e.g., on a graphical user interface of a computing device operated by a technician, a multi-dimensional (e.g., two or three dimensional) depiction of the trajectory corridor, e.g., within a multi-dimensional depiction of an environment or workspace in which the robot is to operate.

At block 508, the system may identify one or more portions of the trajectory corridor that intersect, or that likely will intersect, one or more obstacles of the environment in which the robot is to operate. In some implementations, for dynamic obstacles (e.g., obstacles that move relative to the environment), the system may calculate a likelihood and/or duration of time for which an obstacle will intersect the trajectory corridor.

At block 510, the system may visually emphasize the one or more intersecting or potentially intersecting portions of the trajectory corridor that were identified at block 508. In some implementations, portions of the trajectory corridor that intersect static obstacles may be visually emphasized in one manner (e.g., using a particular color or fill pattern). Portions of the trajectory corridor that will likely intersect dynamic obstacles, or that will intersect dynamic obstacles for some time interval, may be visually emphasized in another manner (e.g., using another color or fill pattern). In some implementations, portions of the trajectory corridor that will intersect a dynamic obstacle may be selectively visually emphasized based on time intervals for which those dynamic obstacles will intersect the trajectory corridor (e.g., to indicate a likelihood that the robot would collide with the dynamic obstacle during operation). For example, a portion of the trajectory corridor that would only briefly be intersected by a dynamic obstacle may be colored yellow. Another portion of the trajectory corridor that would intersect a dynamic obstacle for a longer time interval and/or for multiple time intervals may be colored red. In some implementations, portions of the trajectory corridor may be visually emphasized on relative likelihoods that those portions will intersect dynamic obstacles. For example, if there is a slight chance one portion of a trajectory corridor will intersect a moving object, that portion may be colored yellow. If there is a higher chance another portion of the trajectory corridor will intersect a dynamic object, that other portion may be colored red. At optional block 512, the system, e.g., in response to input by a user, may alter a width of one or more portions of the trajectory corridor based on proximities of those portions to obstacles.

At block 514, the system may identify one or more portions of the trajectory corridor that violate kinematic constraints (e.g., are unreachable by) of the robot. At block 516, the system may (e.g., in response to input by a user) visually emphasize these violating portions in various ways, such as using colors and/or fill patterns. At optional block 518, the system, e.g., as controlled by a user, may alter a width of the trajectory corridor near one or more portions that violate the robot's kinematic constraints, e.g., to remove those portions from the trajectory corridor. At block 520, the system may determine a plurality of candidate paths through the trajectory corridor that are traversable by a reference point of a robot end effector. As noted above, a robot may assume multiple, different sequences of joint configurations (or "poses") to traverse its end effector along a single candidate path. Accordingly, in some implementations, a plurality of candidate sequences of joint configurations may be determined for each candidate path, and the most suitable candidate sequence of joint configurations (e.g., that causes the least wear and tear, minimizes joint torque, minimizes extraneous robot motion, causes the smoothest trajectory, quickest, etc.) may be selected for that particular candidate path.

At block 522, the system may select, from the plurality of candidate paths determined at block 520, one or more candidate paths that satisfy some criterion. In some implementations, the criterion may be a path that is considered "optimal." For example, in some implementations, the criterion may be one or more paths that, when traversed by the end effector of the robot, result in the least amount of cost being incurred, or in the quickest traversal of the trajectory corridor. Various costs may be taken into consideration as criteria for selecting paths, such as wear and tear on one or more operational components of the robot, excessive motion by the robot (which, in addition to potentially causing a high level of wear and tear, may be hazardous to nearby equipment and/or personnel), time required for the robot to traverse the end effector between sites, "roughness" of particular paths, and so forth. In some implementations, one or more measures of force, torque, velocity, and/or motion experienced and/or imparted by one or more operational components of the robot may be used as a proxies for cost.

In the examples described previously, including method 500, a seed path is initially defined, and then a trajectory corridor is calculated based on that seed path. However, that is not always required. In some implementations, a trajectory corridor may be created with use of a seed path. For example, a user may operate a graphical user interface that depicts a multi-dimensional environment to trace a trajectory corridor. In some implementations, a width of the trajectory corridor may be selected by a user, e.g., akin to a "brush width," so that as the user provides drawing input to draw the trajectory corridor (e.g., by using a mouse or a finger on a touch screen), a width of the trajectory corridor will automatically be defined based on the user's selection. In some implementations, the user may be able to alter the width, e.g., by inputting a new width using various input elements (e.g., slider bar, drop down menu, etc.). In various implementations, portions of a trajectory corridor drawn in this manner may still be visually emphasized based on their violating kinematic constraints of a robot and/or potentially intersecting an obstacle, as described above.

Figure 6:
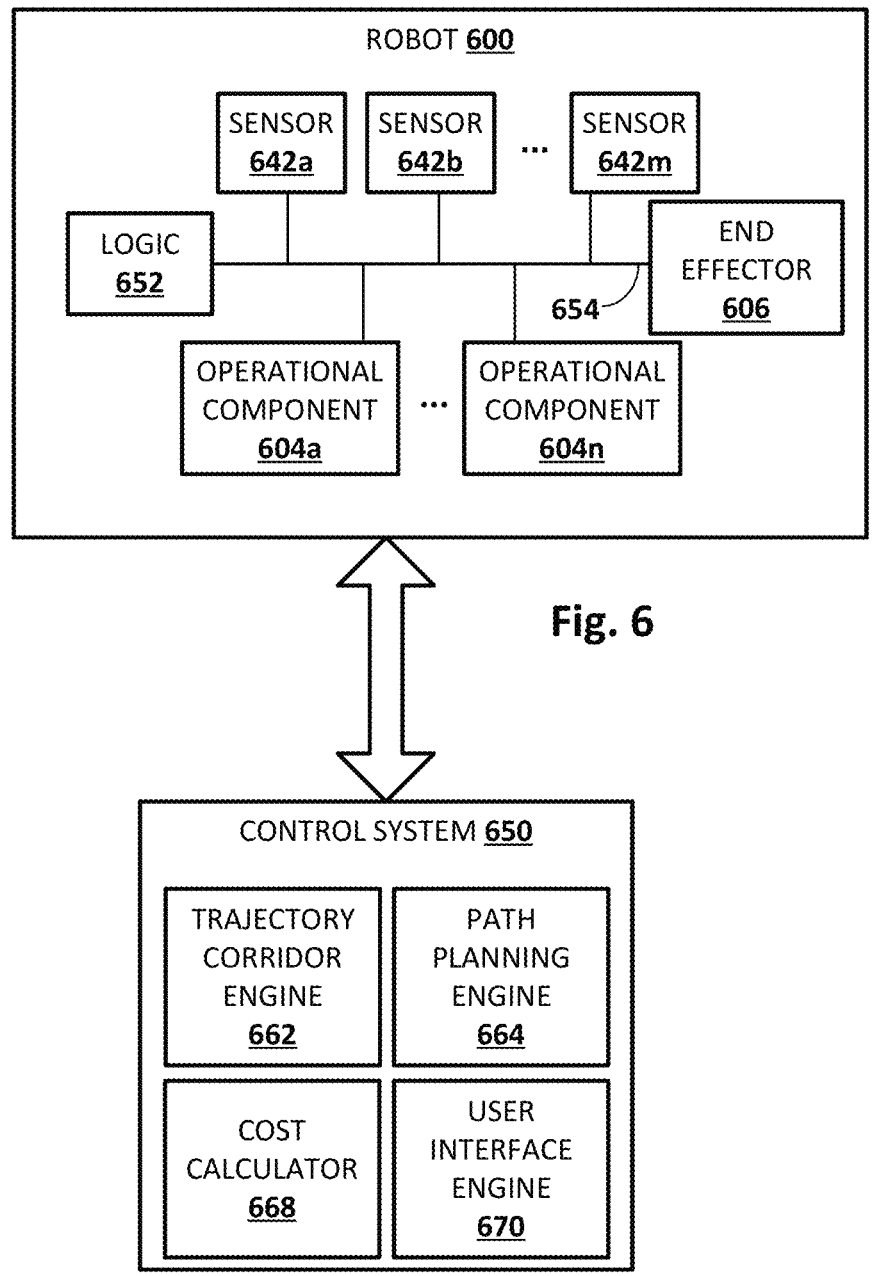
FIG. 6 schematically depicts an example environment in which disclosed techniques may be implemented.

FIG. 6 is a schematic diagram of an example environment in which selected aspects of the present disclosure may be implemented. A robot 600 may be in communication with a control system 650. Robot 600 may take various forms, including but not limited to a robot arm similar to robot 100 described above, a humanoid form, an animal form, a wheeled device, a submersible vehicle, an unmanned aerial vehicle ("UAV"), and so forth. In various implementations, robot 600 may include logic 652. Logic 652 may take various forms, such as one or more processors, one or more field-programmable gate arrays ("FPGA"), one or more application-specific integrated circuits ("ASIC"), one or more so-called "real time controllers," and so forth.

In various implementations, logic 652 may be operably coupled with one or more operational components 604a-n, one or more sensors 642a-m, and/or one or more end effectors 606, e.g., via one or more buses 654. Sensors 642 may take various forms, including but not limited to light sensors, pressure sensors, pressure wave sensors (e.g., microphones), proximity sensors, accelerometers, gyroscopes, and so forth. While sensors 642a-m are depicted as being integral with robot 600, this is not meant to be limiting. In some implementations, sensors 642 may be located external to robot 600, e.g., as standalone units or as part of control system 650.

Control system 650 may include one or computing systems connected by one or more networks (not depicted) that control operation of robot 600 to various degrees and/or that collectively perform selected aspects of the present disclosure. An example of such a computing system is depicted schematically in FIG. 7. In some implementations, control system 650 exerts a relatively high level of control over robot 600, e.g., in real time in response to signals received at a user interface engine 670 and/or one or more readings from one or more sensors 642. In other implementations, control system 650 exerts less direct control over robot 600. For example, control system 650 may provide robot 600 with high level tasks (e.g., "pick up object", "place object into receptacle"), data indicative of one or more obstacles to avoid, and/or other general constraints that robot 600 may be unable to ascertain itself by processing signals from sensors 642. Logic 652 on robot 600 may convert such high level commands and other data into robot action, e.g., by translating one or more high level tasks into a plurality of instructions or motion primitives executable by robot 600.

Various modules or engines may be implemented as part of control system 650 as software, hardware, or any combination of the two. For example, in FIG. 6, control system 650 includes a trajectory corridor engine 662, a path planning engine 664, a cost calculator 668, and the aforementioned user interface engine 670. Trajectory corridor engine 662 may be configured to calculate, based on a seed path, a trajectory corridor that encompasses and expands the seed path, e.g., as described above at block 504 of FIG. 5. In some implementations, trajectory corridor engine 662 may be further configured to identify portions of the trajectory corridor that intersect (or will potentially will intersect) an obstacle and/or portions of the trajectory that violate kinematic constraints of robot 600 (e.g., are unreachable), as well as adjust the width of the trajectory corridor in response, as described above generally at blocks 508-518 of FIG. 5.

In various implementations, path planning engine 664 may be configured to determine a plurality of paths through the trajectory corridor that are traversable by a robot end effector (or more particularly, a reference point of the end effector), as described above at block 520 of FIG. 5. In some implementations, path planning engine 664 and/or trajectory corridor engine 662 may be configured to select "most suitable" and/or "good enough" paths. In various implementations, this selection may be based on a cost, calculated and/or provided by cost calculator 668, which is associated with robot 600 traversing a reference point of an end effector determined by path planning engine 664.

User interface engine 670 may facilitate user input of various commands or tasks for robot 600, as well as output of various information, such as multi-dimensional renditions of a seed path and/or trajectory corridor. In some implementations, user interface engine 670 may provide data that may be used by a mobile computing system such as a smart phone or tablet to render a graphical user interface. A user may operate the graphical user interface to control robot 600 to various degrees. For example, to define a seed path as described above, a user may operate the graphical user interface to define one or more waypoints on a three-dimensional rendition of an environment in which robot 600 operates. In some implementations, user interface engine 670 may be operable by a user to cause robot 600 to enter a "training" mode in which the user may manually manipulate one or more operational components or robot 600 (e.g., end effector 106) along one or more paths, all while robot 600 continuously and/or periodically records its coordinates. In some implementations, user interface engine 670 may receive an indication, e.g., from trajectory corridor engine 662, that one or more portions of a trajectory corridor intersect (or likely will intersect) an obstacle, or that one or more portions of a trajectory corridor violate kinematic constraints of robot 600, and user interface engine 670 may cause the trajectory corridor to be rendered with these portions visually emphasized as described above. A user also may be able to interact with user interface engine 670 to provide commands to edit a trajectory corridor, as described above.

While robot 600 and control system 650 are depicted separately in FIG. 6, this is not meant to be limiting. In various implementations, one or more aspects (e.g., modules, engines, user interface engine 670, etc.) depicted in FIG. 6 as implemented on one of robot 600 or control system 650 may be implemented on the other, may be distributed across both, and/or may be distributed across one or both in combination with other components not depicted in FIG. 6. In implementations where robot 600 and control system 650 are separate, they may communicate over one or more wired or wireless networks (not depicted), or using other wireless technologies, such as radio, infrared, Bluetooth, etc. In other implementations, control system 650 may be implemented entirely or in part using logic 652 of robot 600.

Figure 7:
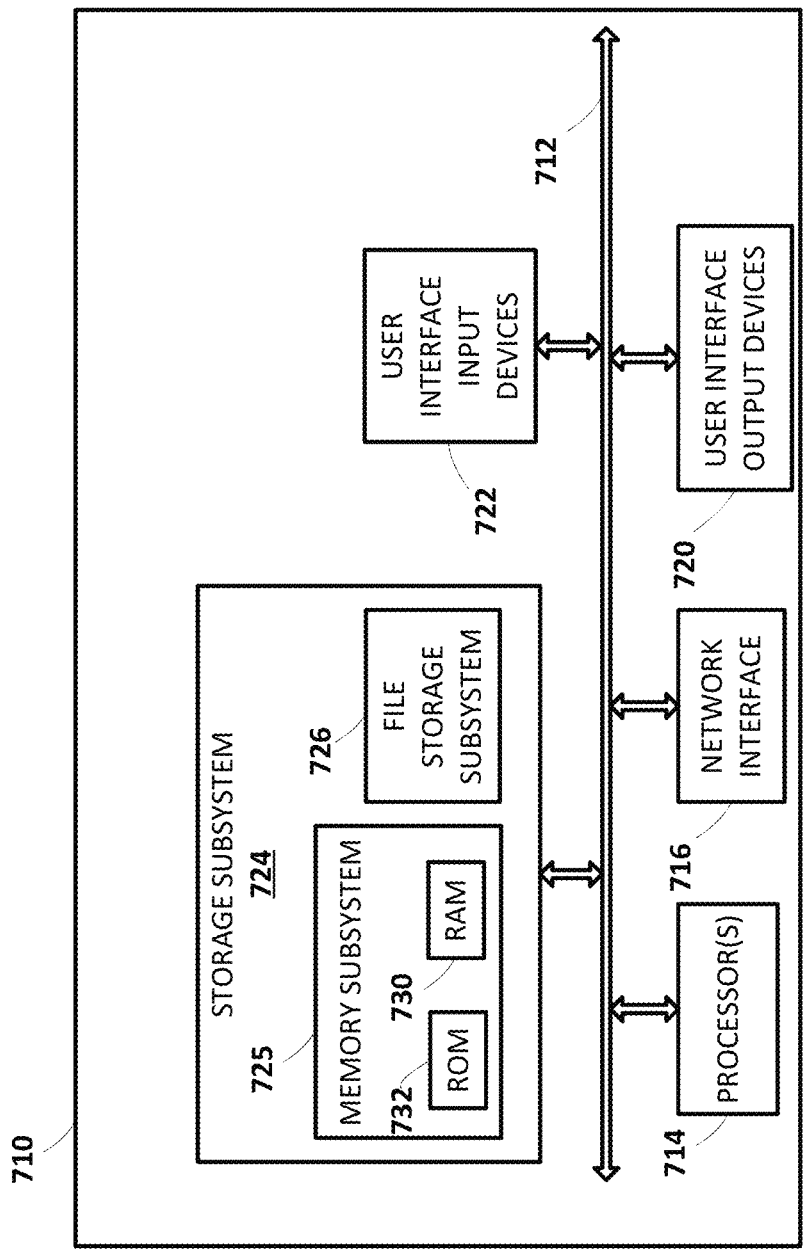
FIG. 7 schematically depicts an example architecture of a computer system.

FIG. 7 is a block diagram of an example computer system 710. Computer system 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computer system 710. Network interface subsystem 716 provides an interface to outside networks and is coupled to corresponding interface devices in other computer systems.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 710 to the user or to another machine or computer system.

Storage subsystem 724 stores programming and data constructs that provide the functionality of some or all of the modules described herein. For example, the storage subsystem 724 may include the logic to perform selected aspects of method 500, and/or to implement one or more aspects of logic 652, trajectory corridor engine 662, path planning engine 664, cost calculator 668, and user interface engine 670. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a CD-ROM drive, an optical drive, or removable media cartridges. Modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computer system 710 communicate with each other as intended. Although bus subsystem 712 is shown schematically as a single bus, alternative implementations of the bus subsystem may use multiple busses.

Computer system 710 can be of varying types including a workstation, server, computing cluster, blade server, server farm, smart phone, smart watch, smart glasses, set top box, tablet computer, laptop, or any other data processing system or computing device. Due to the ever-changing nature of computers and networks, the description of computer system 710 depicted in FIG. 7 is intended only as a specific example for purposes of illustrating some implementations. Many other configurations of computer system 710 are possible having more or fewer components than the computer system depicted in FIG. 7.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A computer-implemented method, comprising:
   determining, by one or more processors, a seed path between first and second sites that is traversable by a reference point associated with an end effector of a robot, wherein the determining is based on user input in the form of a user tracing the seed path on a graphical user interface so that the reference point associated with the end effector traverses the seed path;
   calculating, by the one or more processors based on the seed path, a trajectory corridor that encompasses and expands the seed path to a width;
   rendering, by the one or more processors, on the graphical user interface, a multi-dimensional depiction of one or both of the seed path and the trajectory corridor;
   altering the width at a portion of the trajectory corridor based on user interaction with the graphical user interface;
   determining, by the one or more processors, a plurality of candidate paths through the trajectory corridor that are traversable by the reference point; and
   selecting, by the one or more processors from the plurality of candidate paths, a candidate path that satisfies a criterion.

2. The computer-implemented method of claim 1, wherein the width varies along the seed path.

3. The computer-implemented method of claim 2, wherein calculating the trajectory corridor comprises calculating a plurality of volumes that, arranged along the seed path, form the trajectory corridor.

4. The computer-implemented method of claim 2, further comprising altering the width at a portion of the trajectory corridor based on a proximity of the portion to an obstacle.

5. The computer-implemented method of claim 1, wherein the user interaction comprises the user pinching two fingers closer together on a touch screen that renders the graphical user interface.

6. The computer implemented method of claim 1, further comprising identifying a portion of the trajectory corridor that either intersects an obstacle, or that likely will intersect the obstacle.

7. The computer-implemented method of claim 6, further comprising visually emphasizing the identified portion in the multi-dimensional depiction of the trajectory corridor.

8. The computer-implemented method of claim 1, further comprising:
calculating, by the one or more processors, based on the trajectory corridor and the seed path, a first candidate path through the trajectory corridor;
rendering, by the one or more processors in the graphical user interface, a multi-dimensional depiction of the first candidate path;
determining that the first candidate path fails to satisfy the criterion;
calculating, by the one or more processors, based on the trajectory corridor and the first candidate path, a second candidate path through the trajectory corridor; and
rendering, by the one or more processors in the graphical user interface, a multi-dimensional depiction of the second candidate path.

9. The computer-implemented method of claim 1, wherein the criterion is a measure of trajectory smoothness.

10. The computer-implemented method of claim 1, further comprising identifying, by the one or more processors, a portion of the trajectory corridor that violates a kinematic constraint of the robot.

11. The computer-implemented method of claim 10, further comprising rendering, by the one or more processors, in the graphical user interface, the identified portion in the multi-dimensional depiction of the trajectory corridor in a different color or fill pattern than a remainder of the trajectory corridor.

12. At least one non-transitory computer-readable medium comprising instructions that, in response to execution of the instructions by a computing system, cause the computing system to perform the following operations:
rendering, on a display, a graphical user interface that includes a depiction of an environment in which a robot is to operate;
receiving drawing input indicative of a seed path traced by a user within the depiction of the environment;
determining, in response to the drawing input indicative of the seed path, a trajectory corridor between first and second sites that encompasses and expands the seed path, wherein at least a portion of the trajectory corridor has a width such that a reference point associated with an end effector of the robot is traversable along multiple paths through the trajectory corridor;
rendering, in the graphical user interface, a multi-dimensional depiction of the trajectory corridor;
altering the width at a portion of the trajectory corridor in response to the user pinching two fingers closer together on a touch screen that renders the graphical user interface;
determining a plurality of candidate paths through the trajectory corridor that are traversable by the reference point of the end effector; and
selecting, from the plurality of candidate paths, a candidate path that satisfies a criterion.

13. The at least one non-transitory computer-readable medium of claim 12, further comprising instructions that, in response to execution of the instructions by the computing system, cause the computing system to receive, at the graphical user interface, an indication of the trajectory corridor width.

14. A system comprising one or more processors and memory operably coupled with the one or more processors, wherein the memory stores instructions that, in response to execution of the instructions by one or more processors, cause the one or more processors to:
determine a seed path between first and second sites that is traversable by a reference point associated with an end effector of a robot, wherein the determination is based on user input in the form of a user tracing the seed path on a graphical user interface so that the reference point associated with the end effector traverses the seed path;
calculate, based on the seed path, a trajectory corridor that encompasses and expands the seed path to a width;
render, on the graphical user interface, a multi-dimensional depiction of one or both of the seed path and the trajectory corridor;
alter, on the graphical user interface, the width at a portion of the trajectory corridor based on user interaction with the graphical user interface;
identify a portion of the trajectory corridor that violates a kinematic constraint of the robot;
visually emphasize the identified portion in the multi-dimensional depiction of the trajectory corridor in the graphical user interface;
determine, by the one or more processors, a plurality of candidate paths through the trajectory corridor that are traversable by the reference point; and
select, from the plurality of candidate paths, a candidate path that satisfies a criterion.

15. The system of claim 14, wherein the width varies along the seed path.

16. The system of claim 15, wherein the trajectory corridor includes a plurality of volumes that, arranged along the seed path, form the trajectory corridor.

* * * * *